(12) United States Patent
Kusachi

(10) Patent No.: US 8,166,259 B2
(45) Date of Patent: Apr. 24, 2012

(54) MEMORY CONTROL APPARATUS, MEMORY CONTROL METHOD AND INFORMATION PROCESSING SYSTEM

(75) Inventor: Souta Kusachi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 532 days.

(21) Appl. No.: 12/411,651

(22) Filed: Mar. 26, 2009

(65) Prior Publication Data

US 2009/0248999 A1    Oct. 1, 2009

(30) Foreign Application Priority Data

Mar. 27, 2008   (JP) ................................. 2008-082718

(51) Int. Cl.
*G06F 12/00* (2006.01)
*G06F 9/30* (2006.01)

(52) U.S. Cl. ........ 711/158; 711/137; 711/138; 711/213; 712/205; 712/206; 712/207

(58) Field of Classification Search .................. 711/137, 711/138, 158, 213; 712/205, 206, 207
See application file for complete search history.

(56) References Cited

U.S. PATENT DOCUMENTS

| | | | |
|---|---|---|---|
| 4,371,927 A * | 2/1983 | Wilhite et al. ................ | 711/137 |
| 5,461,718 A | 10/1995 | Tatosian et al. | |
| 5,845,323 A * | 12/1998 | Roberts et al. ................ | 711/128 |
| 5,860,104 A * | 1/1999 | Witt et al. ..................... | 711/137 |
| 6,131,155 A | 10/2000 | Alexander et al. | |
| 6,212,603 B1 * | 4/2001 | McInerney et al. ........... | 711/125 |
| 6,681,274 B2 | 1/2004 | Ennis | |
| 7,120,743 B2 | 10/2006 | Meyer et al. | |
| 7,392,331 B2 | 6/2008 | James et al. | |
| 2003/0172235 A1 | 9/2003 | Letey et al. | |
| 2008/0270758 A1* | 10/2008 | Ozer et al. .................... | 712/206 |
| 2009/0182944 A1* | 7/2009 | Comparan et al. ............ | 711/122 |

FOREIGN PATENT DOCUMENTS

| | | |
|---|---|---|
| JP | 62-245462 | 10/1987 |
| JP | 2000-181885 | 6/2000 |

OTHER PUBLICATIONS

Korean Intellectual Property Office: "Korean Office Action" issued Oct. 25, 2010 in corresponding Korean Patent Application No. 10-2009-0002661, with English-language translation.
"Extended European Search Report", mailed by EPO and corresponding to European application No. 08173094.7 on Mar. 8, 2011.

* cited by examiner

*Primary Examiner* — Kevin Ellis
*Assistant Examiner* — Mehdi Namazi
(74) *Attorney, Agent, or Firm* — Fujitsu Patent Center

(57) ABSTRACT

A memory control apparatus, a memory control method and an information processing system are disclosed. Fetch response data retrieved from a main storage unit is received, while bypassing a storage unit, by a first port in which the received fetch response data can be set. The fetch response data retrieved from the main storage unit, if unable to be set in the first port, is set in a second port through the storage unit. A transmission control unit performs priority control operation to send out, in accordance with a predetermined priority, the fetch response data set in the first port or the second port to the processor. As a result, the latency is shortened from the time when the fetch response data arrives to the time when the fetch response data is sent out toward the processor in response to a fetch request from the processor.

18 Claims, 10 Drawing Sheets

MEMORY CONTROL APPARATUS, MEMORY CONTROL METHOD AND INFORMATION PROCESSING SYSTEM

CROSS-REFERENCE TO RELATED APPLICATION(S)

This application is based upon and claims the benefit of priority of the prior Japanese Application No. 2008-082718, filed on Mar. 27, 2008 in Japan, the entire contents of which are hereby incorporated by reference.

FIELD

The embodiment discussed herein is a technique for retrieving a fetch response data from a main storage unit in response to a fetch request of a processor and sending the fetch response data to the processor.

BACKGROUND

Generally, from the viewpoint of attaining a high speed and high performance of an information processing system, the integrated circuit mounted on a system board thereof is required to process and transmit/receive packets within a shorter time (see Japanese Patent Application Laid-Open No. 62-245462, for example).

FIG. 8 is a block diagram schematically showing an example of the configuration of the system board of the conventional information processing system, and FIG. 9 is a block diagram schematically showing an example of the configuration of a system controller thereof.

A conventional information processing system 80, for example, includes a system board 81, which has mounted thereon, as shown in FIG. 8, an I/O (Input/Output: IO) unit (external input/output controller) 82, a CPU (Central Processing Unit) 83, a plurality of (two, in the case shown in FIG. 8) memories 84a, 84b and a plurality of (two, in the case shown in FIG. 8) system controllers (SC) 85a, 85b.

The I/O unit 82 is a device for controlling the transmission/reception of signals to and from devices external to the system board 81. This I/O unit 82 transmits the data received from external devices, for example, to the CPU 83 through the system controller 85a.

The CPU 83 is a device which carries out various arithmetic operations using the data received from the system controllers 85a, 85b. This CPU 83 issues a request to the system controllers 85a, 85b to fetch data from the memories 84a, 84b described later, and receives the fetch response data corresponding to the fetch request from the system controllers 85a, 85b. The fetch response data is packetized data (hereinafter sometimes referred to simply as the packet). The memories 84a, 84b are devices for storing and holding the data.

The conventional information processing system 80 is explained in detail below taking the system controller 85a as an example.

The system controller 85a is a device for controlling the transmission and reception of the data between the CPU 83, the memory 84a and the I/O unit 82.

The system controller 85a retrieves the fetch response data from the memory 84a in response to the fetch request of the CPU 83 and sends it out to the CPU 83.

The system controller 85a, for example, as shown in FIG. 9, is configured of a MAC (memory access controller) 86, a data queue (data queue) 87, a fetch response data port 88, a plurality of (k, in the case shown in FIG. 9, where k is a natural number) ports 89-1 to 89-k and a send-out control unit (CPU sending priority) 90.

The system controller 85a that has received a memory fetch request from the CPU 83 retrieves the fetch response data from the memory 84a. The fetch response data retrieved from the memory 84a is shaped, in the MAC 86, into a packet format operable to be processed by the CPU 83 and stored in the data queue 87 on FIFO (first-in first-out) basis. As long as the fetch response data port 88 for participating in the priority control has a vacancy, the fetch response data is retrieved from the data queue 87 and set in the fetch response data port 88. After that, the fetch response data set in the fetch response data port 88 is sent out toward the CPU 83 from the fetch response data port 88 at the time point when the priority is acquired in the send-out control unit 90.

The system controller 85b is a device for controlling the data exchange between the CPU 83, the memory 84b and the I/O unit 82. The configuration and the operation of the system controller 85b are similar to the configuration and the operation, respectively, of the system controller 85a described above.

In the conventional information processing system 80, however, all the fetch response data retrieved from the memory 84a are sent out toward the CPU 83 after being retrieved into the data queue 87. In a case where the capacity of the fetch response data is large, therefore, the write operation into and the read operation from the data queue 87 take considerable time.

Also, even in a case where the packets sent out to the CPU 83 are so small in number and the CPU sending bus has a margin, the fetch response data is required to pass through the data queue 87 without fail. Under any condition, therefore, the write operation and the read operation require some length of time.

The fetch speed is known to have a direct effect on the system performance.

The fact that the fetch response data is sent out to the CPU 83 through the data queue 87, therefore, causes an increased latency and impedes improvement in the performance of the information processing system.

Another cause of the latency increase is the actual path along which the fetch response data passes in the system controller 85a.

FIG. 10 is a diagram for explaining the fetch response path in the system controller of the conventional information processing system, and shows an example of layout of the various parts on the SC chip.

As shown in FIG. 10, for example, the conventional system controller 85a is such that the MAC 86 is arranged at one end and the data queue 87 at the other end of the SC chip, while the send-out control unit 90 is arranged between the MAC 86 and the data queue 87 on the SC chip.

In the case shown in FIG. 10, the fetch response data retrieved from the memory 84a is transmitted to the send-out control unit 90 through the fetch response data port 88 (not shown in FIG. 10) (see reference character "C2" in FIG. 10) after being transmitted to the data queue 87 from the MAC 86 (see reference character "C1" in FIG. 10).

As described above, the path (C1+C2) permitting the fetch response data to participate in the priority control after being retrieved into the data queue 87 on the chip layout results in a long-distance path. The transfer of the fetch response data along this long-distance path is another cause of the increased latency and impedes improved performance of the information processing system.

SUMMARY

In order to achieve the object described above, there is provided a memory control apparatus for retrieving a fetch response data corresponding to a fetch request of a processor from a main storage unit and sending the fetch response data out to the processor, comprising: a storage unit operable to store the fetch response data retrieved from the main storage unit; a first port operable to receive, while bypassing the storage unit, the fetch response data retrieved from the main storage unit and to set the received fetch response data therein; a second port that sets, through the storage unit, the fetch response data retrieved from the main storage unit in a case where the fetch response data cannot be set in the first port; and a transmission control unit that performs priority control to send out the fetch response data set in the first or second port to the processor in accordance with a predefined priority.

To attain the above object, there is provided a memory control method for retrieving the fetch response data corresponding to the fetch request of the processor and sending the fetch response data out to the processor, comprising: a first set step of receiving, while bypassing the storage unit, the fetch response data retrieved from the main storage unit and setting the received fetch response data in the first port under predetermined conditions; a second set step of setting, through the storage unit, the fetch response data retrieved from the main storage unit in a second port in a case where the fetch response data cannot be set in the first port in the first set step; and a sending control step of executing the priority control operation to send out the fetch response data set in the first or second port to the processor in accordance with a predefined priority.

To attain the above object, there is provided an information processing system comprising: a main storage unit; a processor that issues a fetch request to the main storage unit; and a system controller that retrieves a fetch response data from the main storage unit corresponding to the fetch request of the processor and transmits the fetch response data to the processor; wherein the system controller includes: a storage unit operable to store the fetch response data retrieved from the main storage unit; a first port operable to receive, while bypassing the storage unit, the fetch response data retrieved from the main storage unit and to set the received fetch response data therein; a second port that sets, through the storage unit, the fetch response data retrieved from the main storage unit in a case where the fetch response data cannot be set in the first port; and a transmission control unit that performs the priority control operation to send out the fetch response data set in the first or second port, in accordance with a predefined priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed

DESCRIPTION OF THE PREFERRED EMBODIMENTS

Embodiments of the invention are explained below with reference to the drawings.

[1] An Embodiment of the Invention

Figure 1:
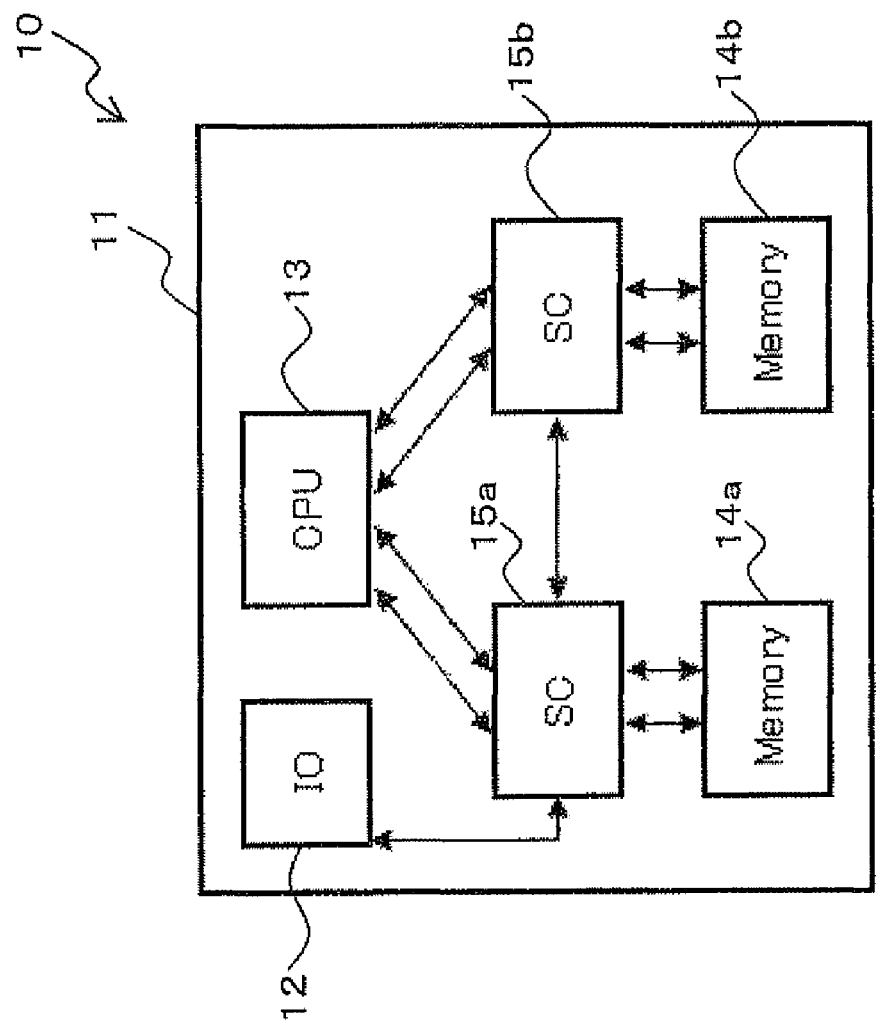
FIG. 1 is a block diagram schematically showing an example of the configuration of an information processing system according to an embodiment of the invention.

FIG. 1 is a block diagram schematically showing an example of the configuration of the information processing system 10 according to an embodiment of the invention.

The information processing system 10 according to an embodiment of the invention includes a system board 11 configured of an integrated circuit having arranged thereon, as shown in FIG. 1, an I/O (input/output: IO) unit (external input/output controller) 12, a CPU (central processing unit: processor) 13, a plurality of (two, in the case shown in FIG. 1) memories (main storage units) 14a, 14b and a plurality of (two, in the case shown in FIG. 1) system controllers (SC: memory control units; system chips) 15a, 15b.

The I/O unit 12 is a device for controlling the transmission and reception of signals to and from devices external to the system board 11. This I/O unit 12 transmits the data received from an external source to the CPU 13 through the system controller 15a. According to this embodiment, packetized data (packets) are used as data transmitted to and received from external devices.

The CPU 13 is a device for performing various arithmetic operations using the data received from the system controllers 15a, 15b. This CPU 13 issues a fetch request to the system controllers 15a, 15b to fetch the data from the memories 14a, 14b described later and receives the fetch response data corresponding to the fetch request from the system controllers 15a, 15b. According to this embodiment, packetized data (packets: response packet data) like the data described above are used as the fetch response data.

The memories 14a, 14b are devices for storing and holding the data. According to this embodiment, the memories 14a, 14b have stored therein the fetch response data corresponding to the fetch request issued from the CPU 13.

The information processing system 10 and the memory control method according to an embodiment of the invention are explained in detail below taking the system controller 15a as an example.

Figure 2:
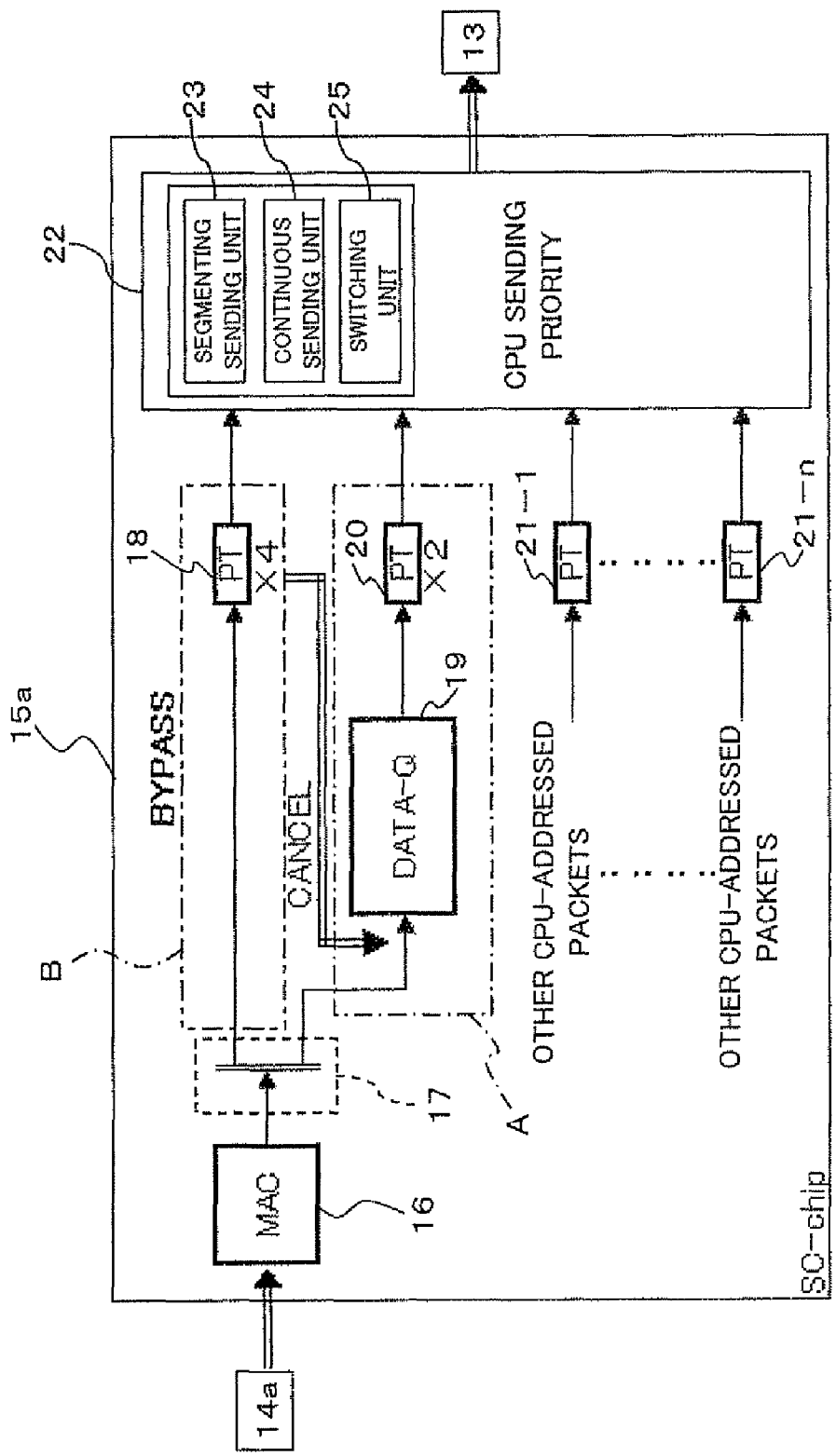
FIG. 2 is a block diagram schematically showing an example of the configuration of a system controller of the information processing system according to an embodiment of the invention.
Figure 3:
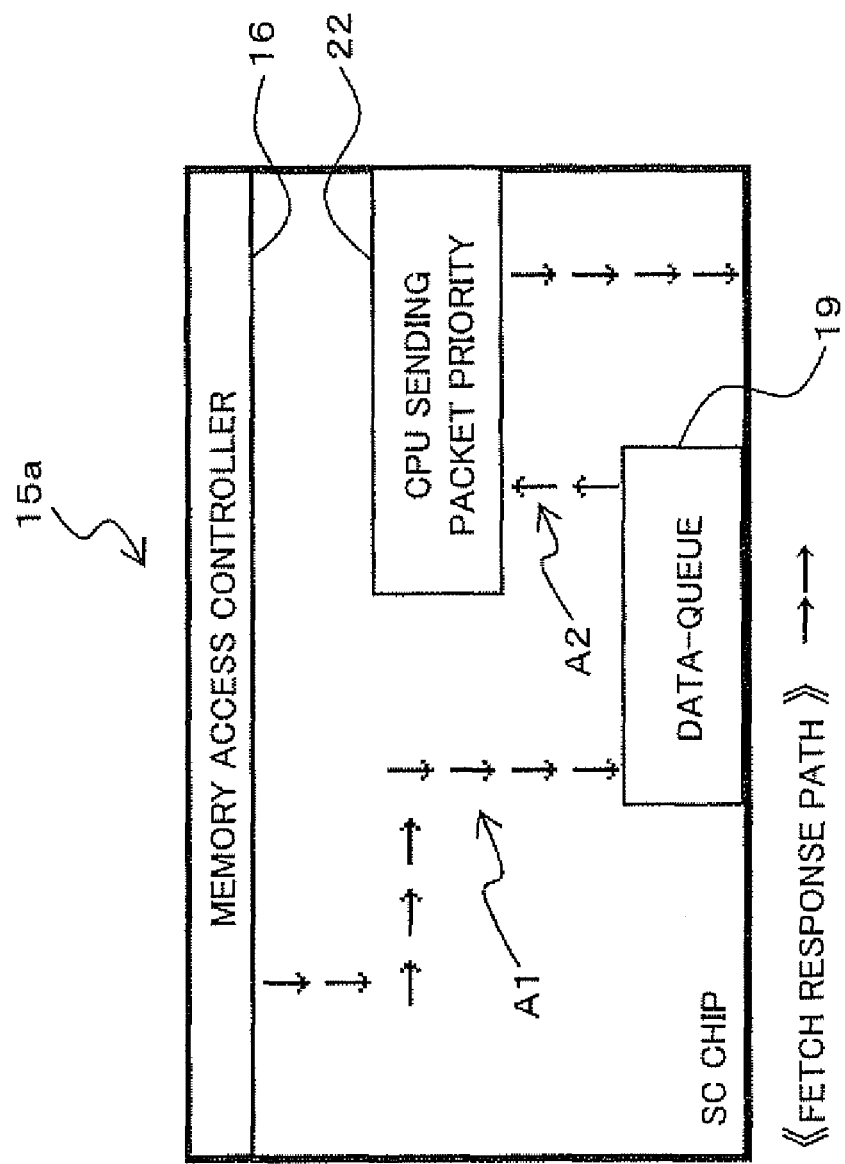
FIG. 3 is a diagram for explaining a fetch response path of a data queue through circuit in the system controller of the information processing system according to an embodiment of the invention.
Figure 4:
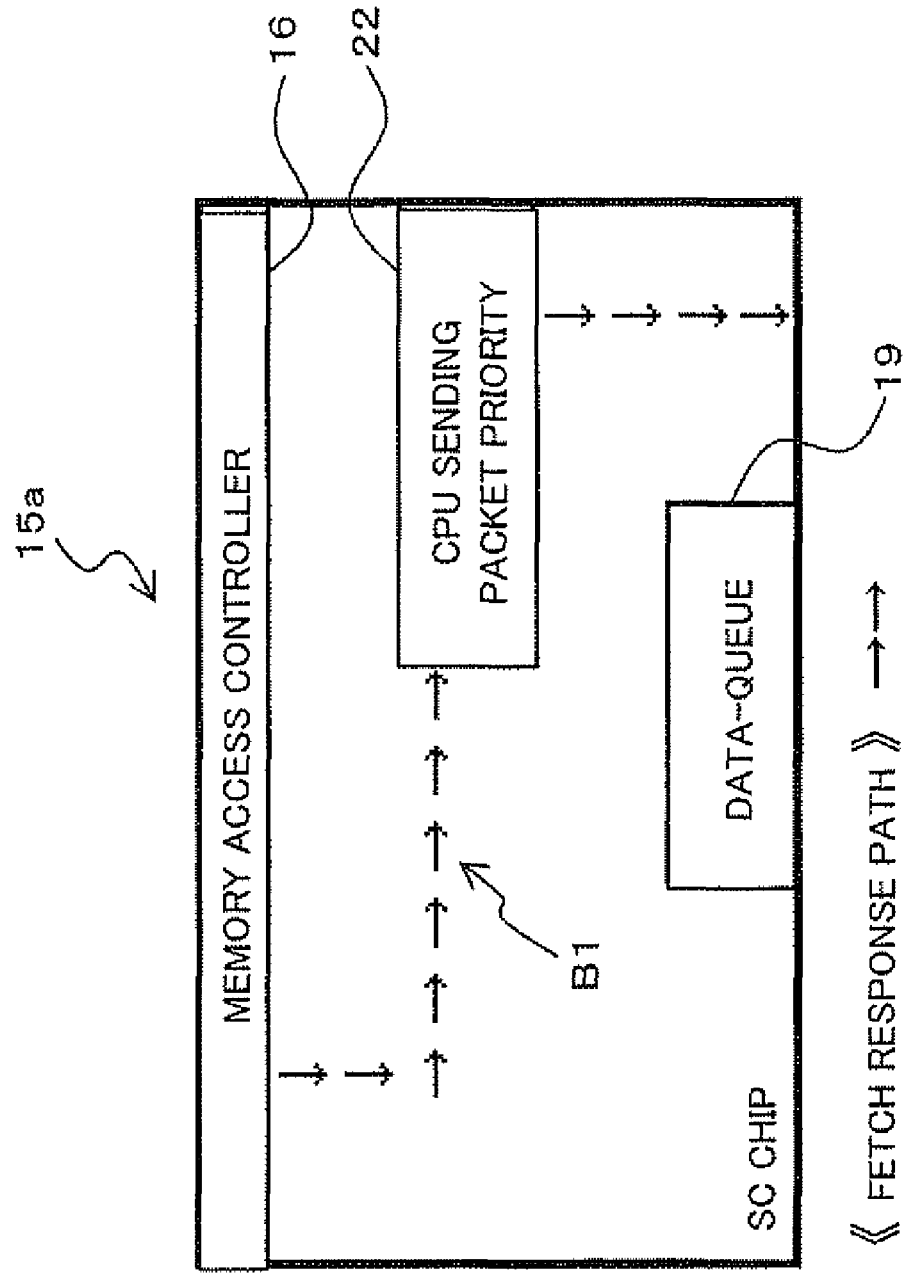
FIG. 4 is a diagram for explaining a fetch response path of a data queue bypass circuit in the system controller of the information processing system according to an embodiment of the invention.

FIG. 2 is a block diagram showing an example of the configuration of the system controller 15a in the information processing system 10 according to an embodiment of the invention. FIG. 3 is a diagram for explaining the fetch response path of the data queue through circuit A in the system controller 15a, and shows an example of layout of the various parts on the SC chip. FIG. 4 is a diagram for explaining the fetch response path of the data queue bypass circuit B in the system controller 15a and shows an example of layout of the various parts on the SC chip.

The system controller 15a is a device for controlling the transmission and reception of the data (exchanging the data) between the CPU 13, the memory 14a and the I/O unit 12.

The system controller 15a retrieves the fetch response data corresponding to the fetch request of the CPU 13 from the memory 14a and transmits the fetch response data to the CPU 13.

The system controller 15a, as shown in FIG. 2, for example, is configured of a memory access controller (MAC) 16, a transmission control unit 17, a first port (bypass-side port) 18, a data queue (DATA Q: storage unit) 19, a second port 20, a plurality of (n, in the case shown in FIG. 2; n is a natural number) ports 21-1 to 21-n and a send-out control unit (CPU sending priority) 22.

In the system controller 15a, as shown in FIGS. 3 and 4, for example, the MAC 16 is arranged at one end on the SC chip and the data queue 19 at the other end on the SC chip. The send-out control unit (CPU sending packet priority) 22 is arranged between the MAC 16 and the data queue 19 on the SC chip.

In the system controller 15a, the data queue through circuit A and the data queue bypass circuit (bypass circuit) B are mounted in parallel to each other on the assumption that a great amount of the fetch response data may arrive at the system controller 15a within a short time.

In the data queue through circuit A, the send-out control circuit 22 is connected in series to the data queue 19, the second port 20 and the send-out control unit 22 in this order.

In the case shown in FIG. 3, the fetch response data retrieved from the memory 14a is transmitted from the MAC 16 to the data queue 19 through the transmission control unit 17 in the data queue through circuit A (see reference character "A1" in FIG. 3), after which the fetch response data is transmitted to the send-out control unit 22 from the data queue 19 through the second port 20 (see the reference character "A2" in FIG. 3).

In the data queue bypass circuit B, on the other hand, the send-out control unit 22 is connected in series to the first port 18 and the send-out control unit 22 in this order.

In the case shown in FIG. 4, the fetch response data retrieved from the memory 14a is transmitted from the MAC 16 to the send-out control unit 22 through the transmission control unit 17 and the first port 18 in the data queue bypass circuit B (see the reference character "B1" in FIG. 4). Specifically, in the data queue bypass circuit B, the fetch response data retrieved from the memory 14a is transmitted to the send-out control unit 22 while bypassing the data queue 19.

The MAC 16 is a device for shaping the fetch response data received (retrieved) from the memory 14a into a packet format processable by the CPU 13.

With the arrival of the fetch response data from the memory 14a, for example, the MAC 16 shapes this fetch response data into a packet format operable to be processed by the CPU 13 from the packet format thus far handled in the memory 14a. According to this embodiment, the packet format thus far handled in the memory 14a is expressed as "(header+16τ)×1 set". The packet format that can be processed in the CPU 13, on the other hand, is expressed as "(header+8τ)×2 sets". τ is a unit indicating the number of clocks and the header is 1τ. Specifically, the MAC 16 shapes the fetch response data into the packet format of 18τ from the packet format of 17τ. The MAC 16 shapes also the fetch response data other than the packet format of 17τ into a predetermined packet format (for example, the packet format of 6τ) using a known method.

The transmission control unit 17 controls the transmission of the fetch response data received from the MAC 16, i.e. the transmission of the fetch response data to the first port 18 and the data queue 19.

In a case where the fetch response data retrieved from the memory 14a is a data of specific type, for example, the transmission control unit 17 transmits (distributes) the particular fetch response data to both the data queue 19 and the first port 18.

The data of specific type is defined as the data which should bypass the data queue 19. According to this embodiment, the transmission control unit 17 determines that the fetch response data shaped into the 18τ packet format is the data of specific type. The determination whether a given packet format is a 18τ packet format or not is made based on the length information of the header (1τ-th packet) included in the fetch response data. As a result, a fetch response data intended to bypass the data queue 19 is confirmed.

In a case where the fetch response data retrieved from the memory 14a is other than of specific type, the transmission control unit 17 transmits the particular fetch response data not to the first port 18 but only to the data queue 19. The data other than the specific type of data is defined as the fetch response data shaped into the packet format other than 18τ or, for example, the fetch response data shaped into the packet format of 6τ.

The first port 18 is for causing the fetch response data (hereinafter sometimes referred to as the first fetch response data) received from the transmission control unit 17 to participate in the priority control in the send-out control unit 22 described later. The priority control is explained in detail later.

This first port 18 is configured of a plurality of (four, in the case shown in FIG. 2) set areas where the fetch response data can be set. The plurality of the set areas are each configured to permit the data of 18τ to be set.

In a case where any vacant set area (hereinafter referred to sometimes as the free space) is available in the plurality of the set areas, the first port 18 determines that the data queue 19 can be bypassed, so that the fetch response data received from the transmission control unit 17 is set in the particular vacant set area. Once the fetch response data is set in the vacant set area, the participation thereof in the priority control is established.

Thus, the first port 18 receives, while bypassing the data queue 19 described later, the fetch response data retrieved from the memory 14a, and sets the received fetch response data in the free space under predetermined conditions. As a result, the condition of the first port 18 on the data queue bypass circuit B side can be confirmed.

Also, the first port 18 functions as a cancel unit which causes the fetch response data (hereinafter sometimes referred to as a second fetch response data) transmitted to the data queue 19 from the transmission control unit 17 to be discarded in a case where a first fetch response data received from the transmission control unit 17 is set in the first port 18.

Specifically, once the first fetch response data received from the transmission control unit 17 is set in the free space of the first port 18, the cancel unit determines that the data queue 19 can be bypassed, and outputs (transmits) a cancel signal toward the second fetch response data. The cancel signal is for invalidating the second fetch response data transmitted to the data queue 19 which, according to this embodiment, is a one-bit Hi signal.

The cancel signal output from the cancel unit, before the second fetch response data is received by the data queue 19, is input (applied) to the second fetch response data. In a case where the first fetch response data and the second fetch response data are transmitted from the transmission control unit 17 at the same time, the timing is fixed from the time when the first fetch response data is set in the free space of the first port 18 to the time point when the cancel signal is input to the second fetch response data. The cancel signal output from the cancel unit, therefore, is input to the second fetch response data at a fixed position on the signal path connecting the transmission control unit 17 and the data queue 19.

Once the cancel signal is input to the second fetch response data, the flag (valid bit) thereof indicating the valid or invalid state is changed from valid to invalid state. Any of the various known methods can be used to change the fetch response data from valid to invalid state by the cancel signal.

In the system controller 15*a* according to this embodiment, therefore, the fetch response data of a specific type is transmitted to the data queue through circuit A and the data queue bypass circuit B at the same time to increase the transfer speed of the fetch response data. After that, the system controller 15*a*, upon establishment of the bypass of the data queue 19 for the first fetch response data, invalidates the second fetch response data on the data queue through circuit A side.

When there is not a vacant set area, on the other hand, the first port 18 discards the fetch response data received from the transmission control unit 17 without setting it in any of the plurality of the set areas. Specifically, as long as all the set areas are occupied by the fetch response data standing by for transmission to the CPU 13, the first port 18 on the data queue bypass circuit B side discards the fetch response data received from the transmission control unit 17 without outputting the cancel signal. The discard of the fetch response data includes the rejection to receive the fetch response data as well as the positive reception and discard of the fetch response data.

The data queue 19 is for storing (accumulating) the fetch response data transmitted from the transmission control unit 17 under predetermined conditions. This data queue 19 accumulates, for example, by sequentially writing the fetch response data transmitted from the transmission control unit 17. Each time a free space is created in the second port 20 described later, the data queue 19 sequentially transmits the accumulated fetch response data to the second port 20 described later by reading them on FIFO (first-in first-out) basis.

Also, the data queue 19, upon reception of the fetch response data invalidated by the cancel signal, discards the invalid fetch response data without writing (or by stopping the write operation). The discard of the fetch response data includes the rejection to receive the fetch response data as well as the positive reception and discard of the fetch response data. In a case where the fetch response data retrieved from the memory 14*a* cannot be set in the first port 18, therefore, the data queue 19 is considered to store the particular fetch response data. In other words, the data queue 19 is considered to store the fetch response data other than of a specific type transmitted from the transmission control unit 17.

The second port 20 is for causing the fetch response data received from the data queue 19 to participate in the priority control in the send-out control unit 22 described later. The priority control is also described in detail later.

The second port 20 is configured of a plurality of (two, in the case shown in FIG. 2) in which the fetch response data can be set. The plurality of the set areas are each operable to set 18τ of data therein.

Each time a vacant set area is created in any one of the plurality of the set areas, the second port 20 reads the fetch response data accumulated in the data queue 19 and sets the fetch response data thus read in the vacant set area. Specifically, in a case where the first fetch response data cannot be set in the first port 18, the second port 20 sets the second fetch response data through the data queue 19. The second port 20 also sets the fetch response data other than of specific type transmitted thereto from the transmission control unit 17, through the data queue 19. Once the fetch response data is set in the vacant set area, the participation thereof in the priority control is established.

The plurality of the ports 21-1 to 21-*n* are each intended to cause the data received from a device (such as the I/O unit 12 or the system controller 15*b*; see FIG. 1) other than the memory 14*a* to participate in the priority control in the send-out control unit 22 described later. The priority control is also described in detail later.

The plurality of the ports 21-1 to 21-*n* are each configured of a set area where various packets addressed to the CPU can be set.

Each time a vacant set area becomes available in each of the plurality of the ports 21-1 to 21-*n*, the data received from a device other than the memory 14*a* is set in the particular vacant set area. Once the data is set in the vacant set area, the participation thereof in the priority control is established.

The send-out control unit 22 is for executing the priority control for the data set in the first port 18, the second port 20 and the plurality of the ports 21-1 to 21-*n*.

Now, the priority control is defined as an operation in which the data set in each of the ports 18, 20, 21-1 to 21-*n* is caused to acquire the priority in accordance with the priority specified in advance for each port and the data that have acquired the particular priority are sent out to the CPU 13 in the order of priority acquisition (the priority control of the CPU sending bus).

According to this embodiment, a high priority is given to the first port 18. Also, according to this embodiment, the send-out control unit 22 uses the CPU sending bus of 18τ in a case where the first port 18 transmits the fetch response data by acquiring the priority of the CPU sending bus. Further, according to this embodiment, the send-out control unit 22 gives priority to both the first port 18 and the second port 20 alternately on LRU (least recently used) basis in a case where the first port 18 and the second port 20 both participate in the priority control. This is to prevent the fetch response data set in one of the ports from becoming incapable of being retrieved.

Thus, the send-out control unit 22, while bypassing the data queue 19, transfers only a specified (18τ) fetch response data high in priority to the CPU 13 in a short distance. Also, in a case where the set area of the first port 18 is saturated, the send-out control unit 22 transfers the fetch response data to the CPU 13 through the data queue 19. Specifically, in accordance with the congestion degree of the send-out control unit 22, either the data queue through circuit A or the data queue bypass circuit B is selected to transmit the fetch response data.

In a case where the transmission control unit 17 transmits the fetch response data to both the data queue 19 and the first port 18, the send-out control unit 22 executes the priority control on the first fetch response data set in the first port 18 or the second fetch response data set in the second port 20.

In a case where a great amount of packets arrive at the system controller 15a within a short time, the transmission to the CPU 13 takes considerable time. According to this embodiment, the leading several packets are caused to participate in the priority control within the shortest time using the data queue bypass circuit B, so that a time margin to write into and read from the data queue 19 can be created for the subsequent packets. As a result, the latency is shortened by the data queue bypass circuit B with the required minimum port package capacity.

Also, the send-out control unit 22 autonomously (dynamically) switches the transfer of the fetch response data to the CPU 13 between the segmenting mode (other packets insertable) and the continuous mode (high-speed packets occupied) in accordance with the condition (traffic volume or degree of congestion) of the first port 18. Specifically, the send-out control unit 22 functions as a segmenting sending unit 23, a continuous sending unit 24 and a switching unit 25.

Figure 5:
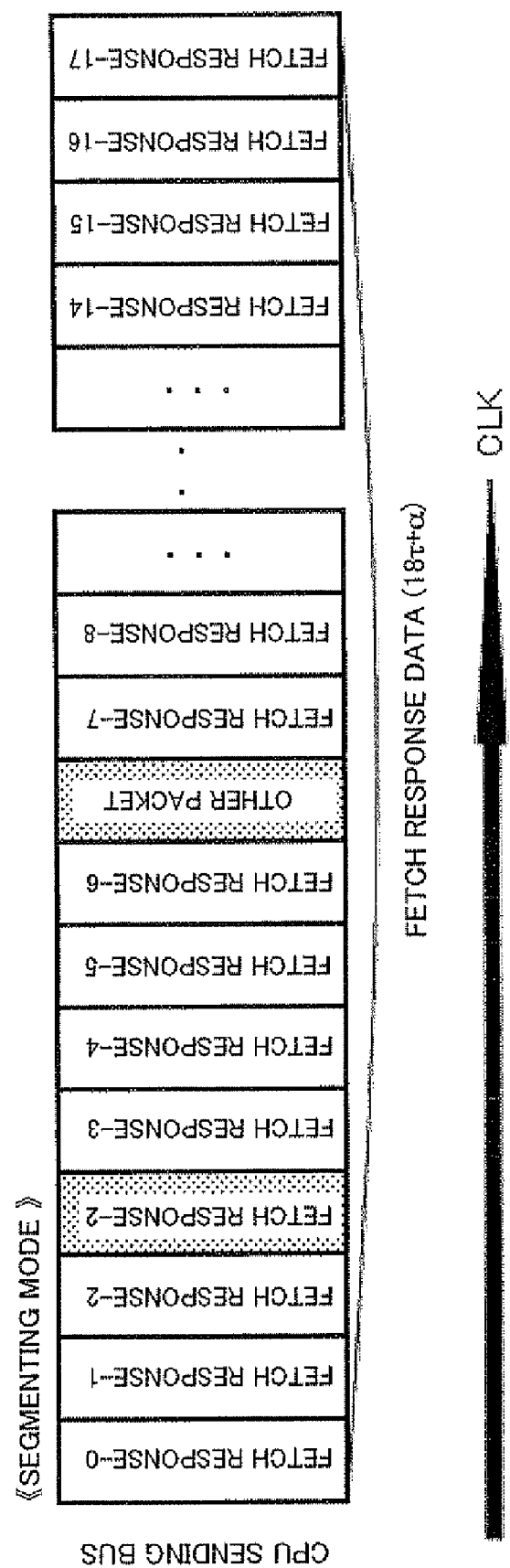
FIG. 5 is a diagram for explaining the function of a segmenting sending unit of the information processing system according to an embodiment of the invention.
Figure 6:
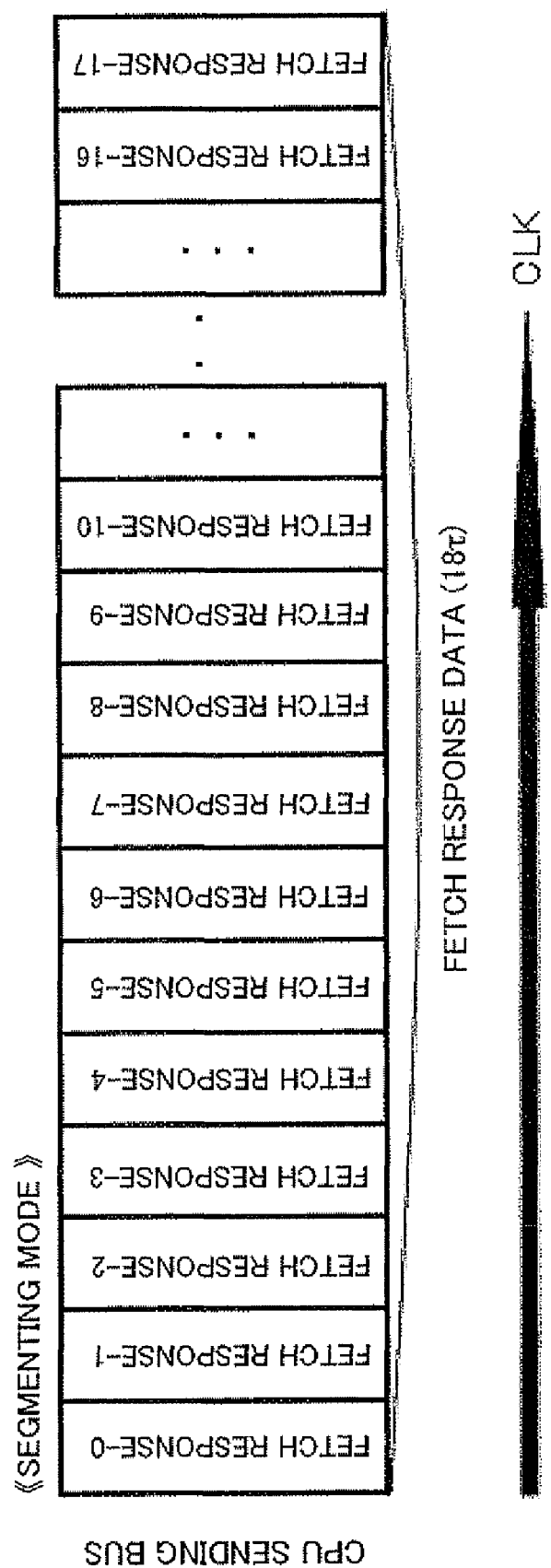
FIG. 6 is a diagram for explaining the function of a continuous sending unit of the information processing system according to an embodiment of the invention.

FIG. 5 is a diagram for explaining the function of the segmenting sending unit 23 in the information processing system 10 according to an embodiment of the invention. FIG. 6 is a diagram for explaining the function of the continuous sending unit 24.

In the segmenting sending unit 23, the fetch response data set in the first port 18 is interrupted by the data higher in priority, and by thus dividing the particular fetch response data, the segmenting mode of transmission to the CPU 13 is executed. According to this embodiment, the data higher in priority than the fetch response data is, for example, a response packet ($1\tau$) or an instruction without data.

In the case shown in FIG. 5, the segmenting sending unit 23 sends out the fetch response data configured of $18\tau$ to the CPU 13 while other data (see "other packet" between "fetch response-2" and "fetch response-3" and "other packet" between "fetch response-6" and "fetch response-7" shown in FIG. 5) higher in priority than the fetch response data are allowed in the fetch response data of $18\tau$ (see "fetch response-0" to "fetch response-17" shown in FIG. 5). The number of the clocks required from the transmission of the first packet of the fetch response data to the last "packet transmission is given as $18\tau+\alpha$ ($\alpha$: number of packets allowed in).

The continuous sending unit 24 executes the continuous mode of operation in which the fetch response data set in the first port 18 are sent out to the CPU 13 as a mass of continuous data.

In the case shown in FIG. 6, the continuous sending unit 24 suppresses the operation to allow in other data than the fetch response data and continuously transmits the fetch response data (see "fetch response-0" to "fetch response-17" shown in FIG. 6) of $18\tau$. Therefore, the number of clocks required for transmission of the first to the last packets of the fetch response data is always $18\tau$.

The switching unit 25 is for switching the segmenting sending unit 23 and the continuous sending unit 24 selectively in accordance with the prevailing condition of the first port 18. Specifically, the switching unit 25 dynamically switches the priority of transmission to the CPU bus (transmission mode switch). This switching unit 25 is connected, for example, to all the set areas of the first port 18 through an AND circuit (not shown).

In a case where no data to be fetched is set in any set area included in the first port 18, a Lo signal is output from the AND circuit. The switching unit 25, upon reception of the Lo signal input from the AND circuit, determines that the first port 18 is not congested, and switches to the segmenting sending unit 23 in order not to excessively store other data higher in priority than the fetch response data.

In a case where the data to be fetched are set in all the set areas of the first port 18, on the other hand, a Hi signal is output from the AND circuit. The switching unit 25, upon reception of the Hi signal input thereto from the AND circuit, determines that the first port 18 is congested and switches to the continuous sending unit 24 to give priority to the transmission of the particular data to the CPU 13. As a result, the data to be fetched are prevented from being excessively stored in the first port 18, thereby exhibiting the higher effect of bypassing the data queue 19.

In the information processing system 10 according to an embodiment of the invention configured as described above, the process of sending out the fetch response data from the memory 14a to the CPU 13 is explained below with reference to the flowchart (steps S11 to S25) shown in FIG. 7.

First, upon issuance of a fetch request from the CPU 13, the memory 14a transmits the fetch response data (step S11).

Next, the MAC 16 receives the fetch response data transmitted from the memory 14a (step S12). Then, the MAC 16 shapes the received fetch response data from the packet format thus far handled in the memory 14a into the packet format that can be processed in the CPU 13 (step S13).

The transmission control unit 17 determines, based on the header length information contained in the fetch response data, whether the fetch response data transmitted from the MAC 16 is of a specific type or not. The transmission control unit 17, upon determination that the fetch response data is of a specific type, transmits the particular fetch response data to both the data queue 19 and the first port 18 (sending control step).

The first port 18 succeeds in bypassing when there is a vacant set area therein (see the "YES" route in step S14). Then, the first port 18 sets the fetch response data received from the transmission control unit 17 in the particular vacant set area (PT set) (step S15; first set step). The fetch response data set in the first port 18 continues to be set in the first port 18 until the priority is acquired in the send-out control unit 22 (see the "NO" route in step S16).

Figure 7:
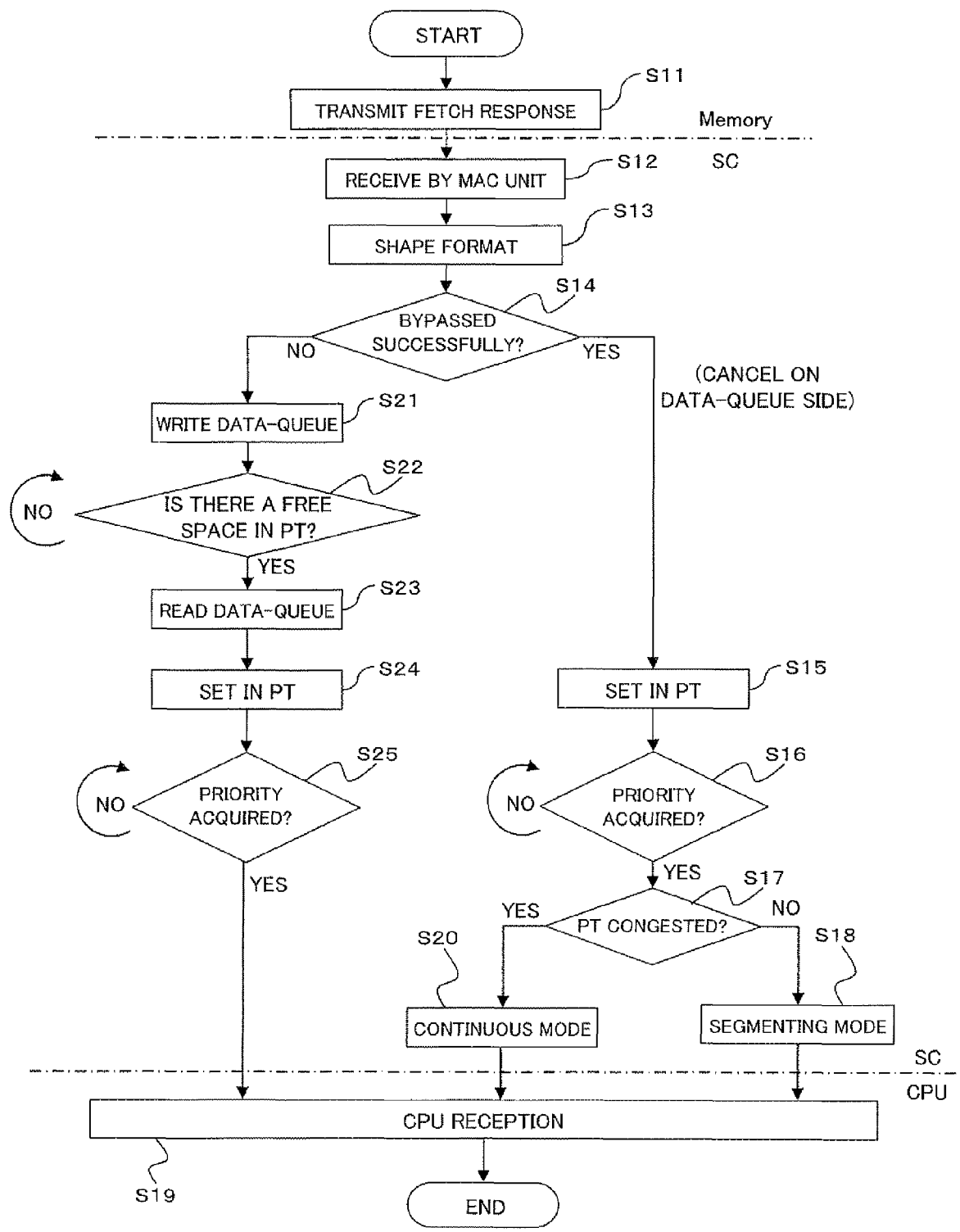
FIG. 7 is a flowchart showing the steps of transmitting the fetch response data from the memory to the CPU in the information processing system according to an embodiment of the invention.
Figure 8:
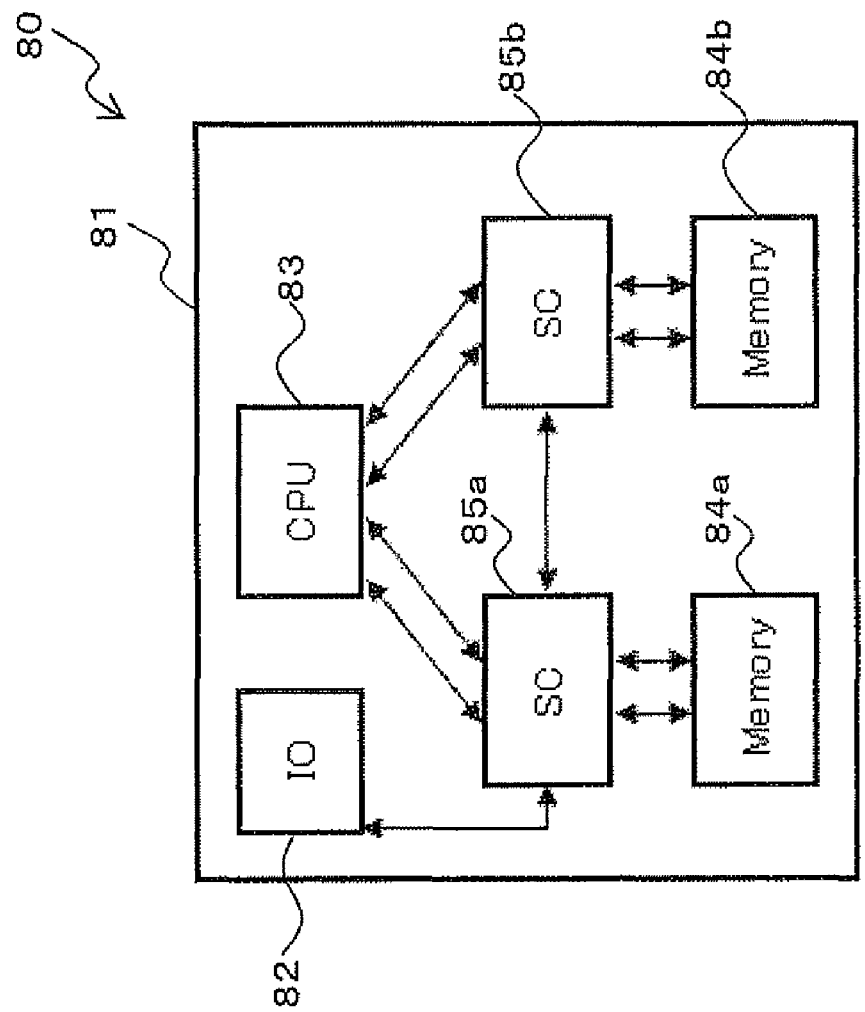
FIG. 8 is a block diagram schematically showing an example of the configuration of the system board of the conventional information processing system.
Figure 9:
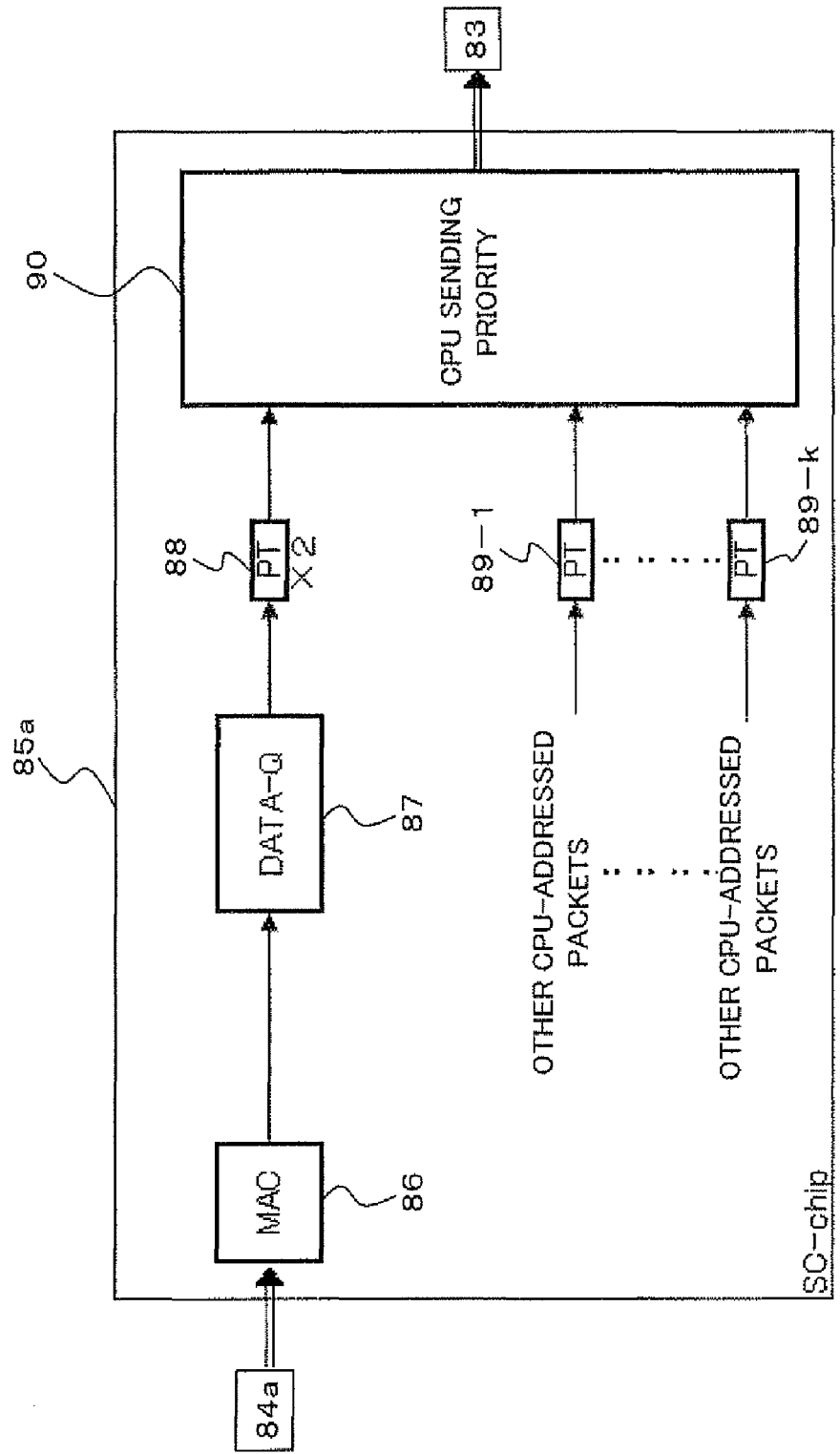
FIG. 9 is a block diagram showing an example of the configuration of the system controller of the conventional information processing system.
Figure 10:
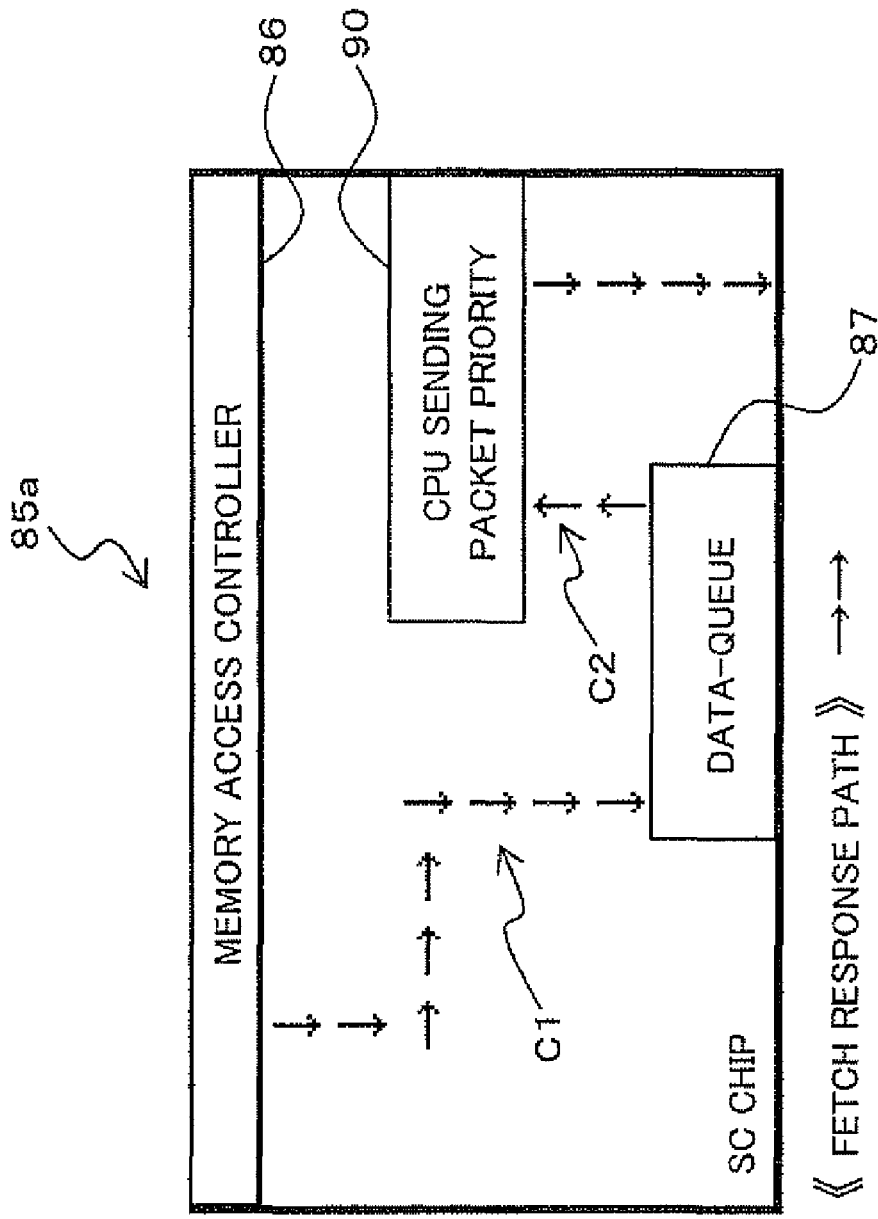
FIG. 10 is a diagram for explaining the fetch response path in the system controller of the conventional information processing system.

Also, the first port 18, once the first fetch response data is set in the first port 18, outputs a cancel signal to the second fetch response data to discard the second fetch response data transmitted to the data queue 19 from the transmission control unit 17 (see "data queue-side cancel" in FIG. 7; also see "cancel step").

The send-out control unit 22 performs priority control for the fetch response data set in the first port 18 (sending control step). Once the priority is acquired by the fetch response data set in the first port 18 (see the "YES" route in step S16), the send-out control unit 22 fetches the particular fetch response data.

The switching unit 25 confirms the condition (PT congestion) of the first port 18 (step S17). In a case where no data to be fetched is set in any set area of the first port 18, the switching unit 25 determines that the first port 18 is not congested and switches to the segmenting sending unit 23 (see the "NO" route in step S17; switching step). The segmenting sending unit 23 segments the fetch response data of 18τ set in the first port 18 and, with the packet higher in priority allowed in the particular fetch response data, sends it out to the CPU 13 (step S18; segmenting sending step). The CPU 13 receives the fetch response data sent from the segmenting sending unit 23 (step S19) and ends the process.

In a case where the data to be fetched are set in all the set areas of the first port 18, on the other hand, the switching unit 25 determines that the first port 18 is congested and switches to the continuous sending unit 24 (see the "YES" route in step S17; switching step). The continuous sending unit 24 suppresses the operation of allowing in other than the fetch response data and continuously sends the fetch response data of 18τ set in the first port 18 to the CPU 13 (step S20; continuous sending step). The CPU 13 receives the fetch response data sent from the continuous sending unit 24 (step S19) thereby to end the process.

Also, the transmission control unit 17, upon determination that the fetch response data is not of specific type, transmits the fetch response data only to the data queue 19. In a case where the fetch response data is of specific type when there is not a vacant set area in the first port, on the other hand, the fetch response data transmitted from the transmission control unit 17 arrives at the data queue 19 without any cancel signal input from the first port 18.

These cases show the failure to bypass the data queue 19 (see the "NO" route in step S14), and the data queue 19 accumulates by writing the fetch response data transmitted from the transmission control unit 17 (step S21).

The fetch response data continues to be stored in the data queue 19 until a vacant set area is generated in the second port 20 (i.e. until the order of transmission comes) (see the "NO" route in step S22).

The second port 20, upon generation of a vacant set area thereof (see the "YES" route in step S22), reads the fetch response data accumulated in the data queue 19, on FIFO basis (step S23), and sets it in the vacant set area (step S24; second set step). The fetch response data set in the second port 20 is kept being set in the second port 20 until the priority is acquired (see the "NO" route in step S25).

The send-out control unit 22 carries out the priority control for the fetch response data set in the second port 20 (sending control step). Once the fetch response data set in the second port 20 acquires the priority (see the "YES" route in step S25), the send-out control unit 22 retrieves the fetch response data.

The send-out control unit 22 sends out the retrieved fetch response data to the CPU 13, which in turn receives the fetch response data sent from the send-out control unit 22 (step S19) thereby to end the process.

The memory control method (operation of the information processing system 10) according to an embodiment of the invention is explained above mainly with reference to the system controller 15a. The system controller 15b is a device for controlling the transmission and reception of the data between the CPU 13, the memory 14b and the I/O unit 12. Both the configuration and operation of the system controller 15b are similar to those of the system controller 15a described above.

As described above, in the information processing system 10 according to an embodiment of the invention, as long as a vacant set area is available in the first port 18 of the data queue bypass circuit B when the fetch response data corresponding to the fetch request from the CPU 13 returns from the memories 14a, 14b, the fetch response data is set directly in the first port 18 without passing through the data queue 19. Then, the fetch response data, once set in the first port 18, establishes the participation in the priority control. When there is not a vacant set area in the first port 18 of the data queue bypass circuit B, on the other hand, the fetch response data is set in the second port 20 after being retrieved provisionally into the data queue 19 as in the conventional path. Then, the fetch response data, once set in the second port 20, establishes the participation in the priority control.

The fetch response data, once set in the first port 18, therefore, can be quickly transferred to the send-out control unit 22 without the write and read operation into and from the data queue 19. Therefore, the latency from the time of arrival of the fetch response data at the system controllers 15a, 15b to the time of transmission toward the CPU 13 can be shortened.

Also, in terms of chip layout, the fetch response data can be quickly transferred to the send-out control unit 22 and can participate in the priority control by setting a short-distance path without passing through the data queue 19 (see the reference character "B1" in FIG. 4). Thus, the latency from the time of arrival of the fetch response data at the system controllers 15a, 15b to the time of transmission toward the CPU 13 can be shortened.

According to this embodiment with the data queue bypass circuit B added, the latency can be improved by 14τ as compared with the conventional transfer path through the data queue 19. This shortens the total latency, by more than about 10%, from the time point when the CPU 13 issues a fetch request to the time point when the CPU 13 receives the fetch response data.

Also, the reliability of the transmission of the fetch response data to the CPU 13 is improved by the cancel unit discarding the second fetch response data transmitted to the data queue 19 from the transmission control unit 17 in a case where the first fetch response data received from the transmission control unit 17 is set in the first port 18.

Further, the possibility or impossibility of the bypass operation can be determined without retrieving an external signal, and therefore, the data can be transferred at the highest rate (high speed) from the viewpoint of latency.

Also, the switching unit 25, upon determination that the first port 18 is congested, switches to the continuous sending unit 24, thereby facilitating the transmission of the fetch response data excessively stored in the first port 18. As a result, the first port 18 is not easily congested, and the probability (success probability) of successful bypassing of the data queue 19 is increased.

[2] Miscellaneous

The present invention is not limited to the embodiments described above and can be embodied in various modifications without departing from the spirit thereof.

For example, the embodiments are described above with reference to a case in which the integrated circuits are formed on the system board 11. Nevertheless, the invention is not limited to such a configuration and applicable to any circuit for packet transfer using a queue.

Also, according to the embodiments described above, the system controller 15a is explained as an example in which the MAC 16 is arranged at one end on the SC chip and the data queue 19 at the other end on the SC chip, with the send-out control unit 22 inserted between the MAC 16 and the data queue 19. This invention, however, is not limited to such a configuration, and the layout on the SC chip can be changed arbitrarily.

Further, the embodiments described above refer to a case in which "(header+16τ)×1 set" is used as a packet format processable by the memory 14a and "(header+8τ)×2 sets" as a packet format processable by the CPU 13. Nevertheless, this invention is not limited to this configuration, and an arbitrary packet format can be used which can be processed by the memory 14a or the CPU 13, as the case may be.

Also, according to this embodiment, in a case where the fetch response data retrieved from the memory 14a is of a specific type, the transmission control unit 17 transmits the fetch response data to both the data queue 19 described later and the first port 18. The invention, however, is not limited to this configuration, and the fetch response data may be transmitted to both the data queue 19 described later and the first port 18 regardless of the type of the fetch response data retrieved from the memory 14a.

Further, the embodiments described above represent a case in which the fetch response data shaped with the packet format of 18τ is used as a data of specific type. The invention is not limited to this configuration, and the fetch response data shaped with an arbitrary packet format can be used as data of specific type.

Furthermore, according to the embodiments described above, the first port 18 has four set areas and the second port 20 has two set areas. The invention is not confined to this case, and the first port 18 may have any number of set areas and so may the second port 20.

The embodiments are described above with reference to a case in which a one-bit Hi signal is used as a cancel signal. The invention is not limited to such a case, and any of various known signals capable of invalidating the second fetch response data transmitted to the data queue 19 can be used with equal effect.

Further, the invention is not limited to the embodiments described above in which the fetch response data on data queue 19 are transmitted to the second port 20 on FIFO basis. Instead, the various known methods other than FIFO can be used.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

The technique disclosed above has at least one of the effects and advantages described below.

In a case where the fetch response data can be set in the first port, the write operation into and the read operation from the storage unit can be omitted and the fetch response data can be transferred at high speed to the transmission control unit.

The latency from the time of arrival to the time of transmission of the fetch response data toward the processor can be shortened.

The possibility or impossibility of bypassing can be determined without retrieving an external signal, and therefore, the data can be transferred at high speed.

What is claimed is:

1. A memory control apparatus for retrieving a fetch response data corresponding to a fetch request of a processor from a main storage unit and sending out the fetch response data to the processor, the apparatus comprising:
   a storage unit operable to store the fetch response data retrieved from the main storage unit;
   a first port operable to receive, while bypassing the storage unit, the fetch response data retrieved from the main storage unit and to set the received fetch response data therein;
   a second port that sets therein, through the storage unit, the fetch response data retrieved from the main storage unit in a case where the fetch response data cannot be set in the first port;
   a transmission control unit that transmits the fetch response data to both the storage unit and the first port in a case where the fetch response data retrieved from the main storage unit is a specific data; and
   a priority control unit that performs priority control to send out the fetch response data set in the first port or the second port to the processor in accordance with a predefined priority.

2. The memory control apparatus according to claim 1, wherein the first port, when there is a free space where the fetch response data can be set, sets the received fetch response data in the free space.

3. The memory control apparatus according to claim 2, wherein the first port, when there is not a free space, discards the received fetch response data.

4. The memory control apparatus according to claim 1, the apparatus comprising:
   a cancel unit that, in a case where a first fetch response data transmitted from the transmission control unit is set in the first port, causes a second fetch response data transmitted from the transmission control unit to the storage unit to be discarded.

5. The memory control apparatus according to claim 4, wherein the transmission control unit transmits the fetch response data retrieved from the main storage unit to the storage unit in a case where the fetch response data is other than a specific data; and
   the second port sets, through the storage unit, the fetch response data other than the specific data, transmitted from the transmission control unit.

6. The memory control apparatus according to claim 1, wherein the priority control unit includes:
   a segmenting sending unit that segments the fetch response data set in the first port, allowing data other than the fetch response data to be interposed in the fetch response data in accordance with the priority and sending out the fetch response data and the other data to the processor;
   a continuous sending unit that sends out continuously to the processor the fetch response data set in the first port; and
   a switching unit that selectively switches between the segmenting sending unit and the continuous sending unit in accordance with the condition of the first port.

7. A memory control method for retrieving a fetch response data corresponding to a fetch request of a processor from a main storage unit and sending out the fetch response data to the processor, the method comprising:
   receiving, while bypassing a storage unit, the fetch response data retrieved from the main storage unit and setting the received fetch response data in a first port under a predetermined condition;
   setting, through the storage unit, the fetch response data retrieved from the main storage unit in a second port, in a case where the fetch response data cannot be set in the first port in the receiving;
   transmitting the fetch response data retrieved from the main storage unit to both the storage unit and the first port in a case where the fetch response data is a specific data; and executing priority control to send out the fetch response data set in the first port or the second port to the processor in accordance with a predefined priority.

8. The memory control method according to claim 7, wherein the receiving includes, under the condition that there is a free space in the first port where the fetch response data can be set, setting the received fetch response data in the free space.

9. The memory control method according to claim 8, wherein the receiving includes discarding the received fetch response data when there is not the free space in the first port.

10. The memory control method according to claim 7, the method comprising:
in a case where a first fetch response data transmitted in the transmitting is set in the first port, causing a second fetch response data transmitted to the storage unit in the executing.

11. The memory control method according to claim 10, wherein the transmitting includes transmitting the fetch response data retrieved from the main storage unit to the storage unit in a case where the fetch response data is other than the specific data; and
the setting includes setting in the second port, through the storage unit, the fetch response data other than the specific data, transmitted in the transmitting.

12. The memory control method according to claim 7, wherein the executing includes:
segmenting the fetch response data set in the first port, allowing data other than the fetch response data to be interposed in the fetch response data in accordance with the priority and sending out the fetch response data and the other data to the processor;
continuously transmitting the fetch response data set in the first port to the processor; and
selectively switching between the segmenting sending step and the continuous sending step in accordance with the condition of the first port.

13. An information processing system comprising:
main storage units;
a processor that issues a fetch request to any one of the main storage units; and
a system controller that retrieves a fetch response data corresponding to the fetch request of the processor from the main storage unit and sends the fetch response data to the processor;
wherein the system controller includes:
a storage unit operable to store the fetch response data retrieved from the main storage unit;
a first port operable to receive, while bypassing the storage unit, the fetch response data retrieved from the main storage unit, and to set the received fetch response data therein;
a second port that sets, through the storage unit, the fetch response data retrieved from the main storage unit in a case where the fetch response data cannot be set in the first port;
a transmission control unit that transmits the fetch response data retrieved from the main storage unit to both the storage unit and the first port in a case where the fetch response data is a specific data; and
a priority control unit that performs priority control to send out the fetch response data set in the first port or the second port to the processor in accordance with a predefined priority.

14. The information processing system according to claim 13, wherein the first port, when there is a free space where the fetch response data can be set, sets the received fetch response data in the free space.

15. The information processing system according to claim 14, wherein the first port, when there is not a free space, discards the received fetch response data.

16. The information processing system according to claim 13, the system controller comprising:
a cancel unit that, in a case where a first fetch response data transmitted from the transmission control unit is set in the first port, causes a second fetch response data transmitted from the transmission control unit to the storage unit to be discarded.

17. The information processing system according to claim 16, wherein the transmission control unit transmits the fetch response data retrieved from the main storage unit to the storage unit in a case where the fetch response data is other than the specific data; and
the second port sets, through the storage unit, the fetch response data other than the specific data, transmitted from the transmission control unit.

18. The information processing system according to claim 13, wherein the priority control unit includes:
a segmenting sending unit that segments the fetch response data set in the first port, allowing data other than the fetch response data to be interposed in the fetch response data in accordance with the priority and sending out the fetch response data and the other data to the processor;
a continuous sending unit that continuously sends out the fetch response data set in the first port to the processor; and
a switching unit that selectively switches between the segmenting sending unit and the continuous sending unit in accordance with the condition of the first port.

* * * * *